United States Patent
Toivonen et al.

(10) Patent No.: US 7,345,232 B2
(45) Date of Patent: Mar. 18, 2008

(54) AUTOMATIC PERSONAL PLAYLIST GENERATION WITH IMPLICIT USER FEEDBACK

(75) Inventors: Hannu Toivonen, Helsinki (FI); Seppo Pyhälammi, Helsinki (FI)

(73) Assignee: Nokia Corporation, Espoo (FI)

( * ) Notice: Subject to any disclaimer, the term of this patent is extended or adjusted under 35 U.S.C. 154(b) by 126 days.

(21) Appl. No.: 10/702,626

(22) Filed: Nov. 6, 2003

(65) Prior Publication Data

US 2005/0098023 A1  May 12, 2005

(51) Int. Cl.
*G10H 1/00* (2006.01)
(52) U.S. Cl. .......................... 84/615; 709/203
(58) Field of Classification Search ................ 84/609, 84/615; 709/203
See application file for complete search history.

(56) References Cited

U.S. PATENT DOCUMENTS

| | | | |
|---|---|---|---|
| 5,410,344 A * | 4/1995 | Graves et al. ............... | 725/46 |
| 5,585,865 A | 12/1996 | Muramatsu | |
| 5,798,785 A | 8/1998 | Hendricks et al. | |
| 5,801,747 A | 9/1998 | Bedard | |
| 5,977,964 A | 11/1999 | Williams et al. | |
| 6,438,752 B1 | 8/2002 | McClard | |
| 6,446,080 B1 | 9/2002 | Van Ryzin et al. | |
| 2002/0103796 A1 * | 8/2002 | Hartley ........................ | 707/4 |
| 2002/0129693 A1 | 9/2002 | Wilks | |
| 2003/0182100 A1 | 9/2003 | Plastina et al. | |
| 2003/0185110 A1 | 10/2003 | Fujisawa | |
| 2003/0221541 A1 * | 12/2003 | Platt ............................ | 84/609 |
| 2004/0117442 A1 * | 6/2004 | Thielen ...................... | 709/203 |
| 2004/0123725 A1 * | 7/2004 | Kim ............................ | 84/609 |
| 2004/0131333 A1 * | 7/2004 | Fung et al. .................. | 386/69 |
| 2004/0131383 A1 | 7/2004 | Fung | |
| 2005/0038819 A1 * | 2/2005 | Hicken et al. ........... | 707/104.1 |
| 2005/0165778 A1 | 7/2005 | Kaisar | |
| 2005/0165779 A1 * | 7/2005 | Kaiser et al. ................ | 707/6 |
| 2005/0174488 A1 * | 8/2005 | Chennakeshu .............. | 348/552 |

FOREIGN PATENT DOCUMENTS

EP 1211690 A2 6/2002
WO WO99/35830 7/1999

OTHER PUBLICATIONS

International Search Report for PCT/IB04/03851 mailed Jan. 13, 2005, 4 pages.
EPO Communication for Application No. PCTAB2004003651, dated Oct. 19, 2006, 2 pages.
Linux Journal, An Introduction to MSERV; Drake explains how MSEV can end musical dictatorship by Joshua Drake, pp. 156 and 158, dated Jan. 1, 2001.

* cited by examiner

*Primary Examiner*—Lincoln Donovan
*Assistant Examiner*—Jianchun Qin
(74) *Attorney, Agent, or Firm*—Banner & Witcoff, Ltd.

(57) ABSTRACT

Music selection systems and methods are disclosed. An adaptive set of songs is selected based on implicit feedback from a user. A random set of songs is also selected. A playlist selection module creates a playlist that includes songs from the adaptive set and the random set in a ratio determined by a surprise factor provided by a user. The playlist may also begin with a sure set of songs that are known to be enjoyed by the user.

24 Claims, 6 Drawing Sheets

AUTOMATIC PERSONAL PLAYLIST GENERATION WITH IMPLICIT USER FEEDBACK

BACKGROUND OF THE INVENTION

1. Field of the Invention

The invention relates to mobile media playback devices. More particularly, the invention relates to the generation of playlists of media content to playback on mobile media playback devices.

2. Description of Related Art

Conventional mobile media playback devices allow users to download and playback media, such as music, videos, pictures and images. Exemplary mobile media playback devices include mobile terminals, personal digital assistants, digital cameras, digital video recorders and combination devices. Typical mobile audio players, for example, generally have a relatively small memory capacity that allow for the storage and playback of a limited number of songs. Users store a music library containing songs on a PC or other computer device having a relatively large memory and download a portion of the songs in the music library to the mobile audio player.

The manual selection of songs to add to a playlist can be time consuming and tedious. Attempts have been made to automate the playlist selection process. One method includes selecting a random group of songs from the music library. This method can result in the playlist including a large number of songs that are not liked by the user.

Another prior art method includes generating a playlist that includes songs most liked by the user. This approach can lead to degenerative playlists. The playlists can become dominated by the same songs played over and over again. Some systems rely on the use of metadata to compare attributes of new songs to the attributes of songs that a user has indicated as enjoying. Without the required metadata, such systems do not work.

These drawbacks are not unique to mobile audio players and also apply to other mobile media playback devices.

Therefore, there is a need in the art for playlist selection systems and methods that automatically generate lists that include media pieces that a user likes while minimizing repetition and keeping aspects of surprise within the lists.

BRIEF SUMMARY OF THE INVENTION

One or more of the above-mentioned needs in the art are satisfied by the disclosed playlists selection systems and methods. An adaptive set of media pieces is selected based on activities of a user. A random set of media pieces is also selected. A playlist selection module creates a playlist that includes media pieces from the adaptive set and the random set in a ratio determined by a surprise factor provided by a user. The playlist may also begin with a sure set of media pieces that are known to be enjoyed by the user.

In a first embodiment, a method of generating a playlist is provided. The method includes assigning individual weights to a plurality of songs based on activities of a user and selecting a plurality of songs from the music library, wherein the probability of each song being selected corresponds to the weight assigned to the song.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
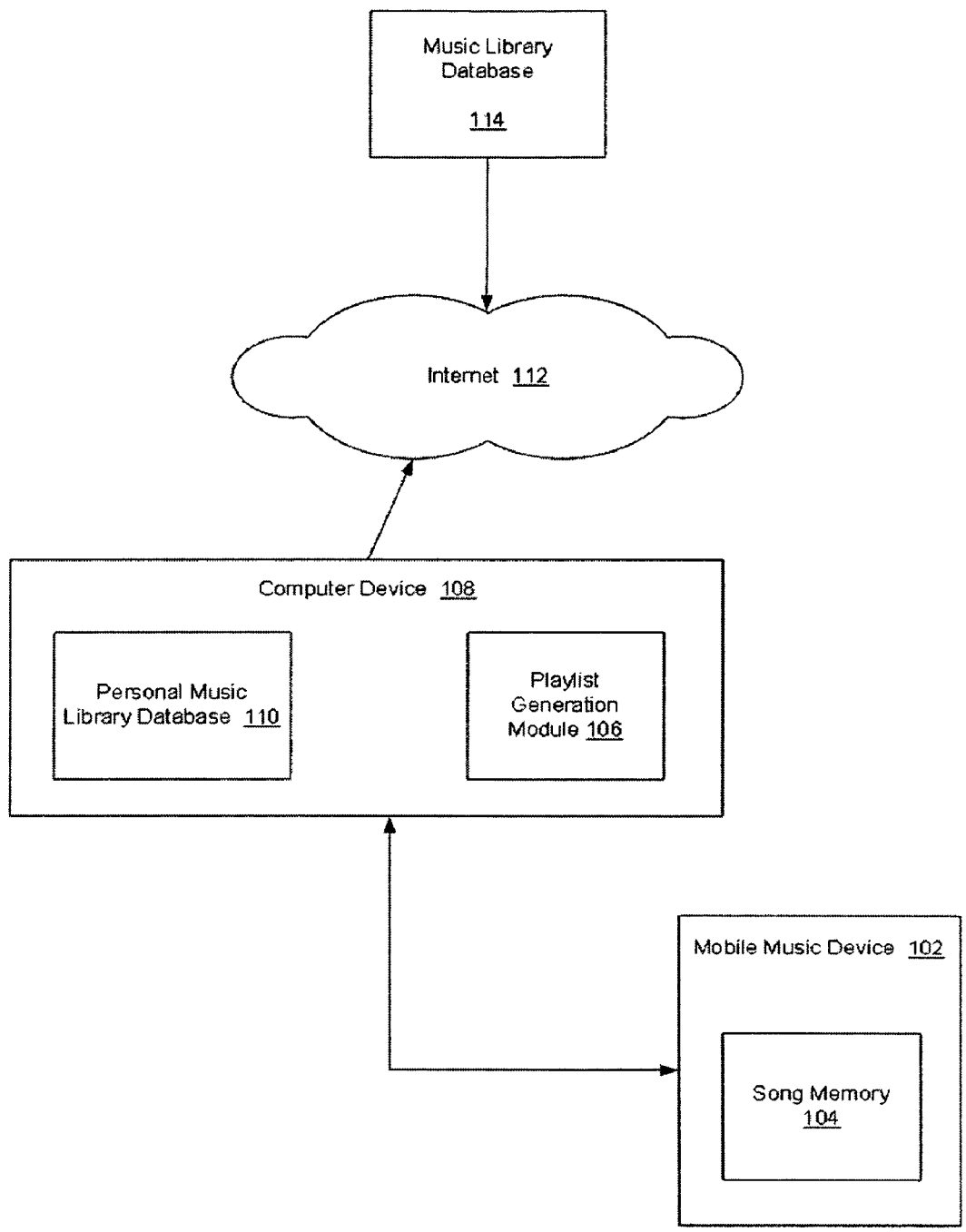
FIG. 1 shows a schematic diagram of a mobile music system in accordance with an embodiment of the invention.

FIG. 1 illustrates a mobile music system in accordance with an embodiment of the invention. A mobile music device 102 stores and plays songs to a user. Mobile music device 102 may be implemented with an MP3 player, mobile telephone, personal digital assistant or other portable handheld electronic devices that are capable of storing and reproducing music. Mobile music device 102 includes a song memory 104 for storing songs. Song memory 104 may be implemented with a removable memory module or a stationary memory module.

Mobile music device 102 may be coupled to a computer device 108, such as a laptop or desktop computer. One skilled in the art will appreciate that computer device 108 may be implemented with several different devices that have processor capacity for generating a playlist and a memory storage. Computer device 108 may include a personal music library database 110 for storing songs. The capacity of personal music library database 110 is generally larger than the capacity of song memory 104. A playlist generation module 106 is used to select a subset of songs from personal music library database 110 to store in song memory 104. In one alternative embodiment of the invention, one or more of the functions of playlist generation module 106 are performed by a module (not shown) within mobile music device 102.

Computer device 108 may be coupled to a wide area network, such as the Internet 112. Of course numerous databases and music websites, such as music library database 114 are also coupled to the Internet 112. Music library database 114 may store songs that are transmitted to the music library database and/or song memory 104. In one embodiment of the invention, mobile music device 102 is coupled to music library database 114 via the Internet 112 and downloads content directly from the music library database 114. Music library database 114 may also include a playlist generation module for selecting songs to transmit to personal music library database 110 and/or song memory 104.

In one embodiment, computer device 108 may be implemented with a device that reproduces music. A user may record music with mobile music device 102. Mobile music device 102 may generate a playlist or playlist data and transmit the playlist or playlist data to computer device 108. This particular embodiment allows the user to use mobile music device 102 in order to generate a personal playlist while away from home and have the information transferred to a relatively stationary computer device 108.

Figure 1A:
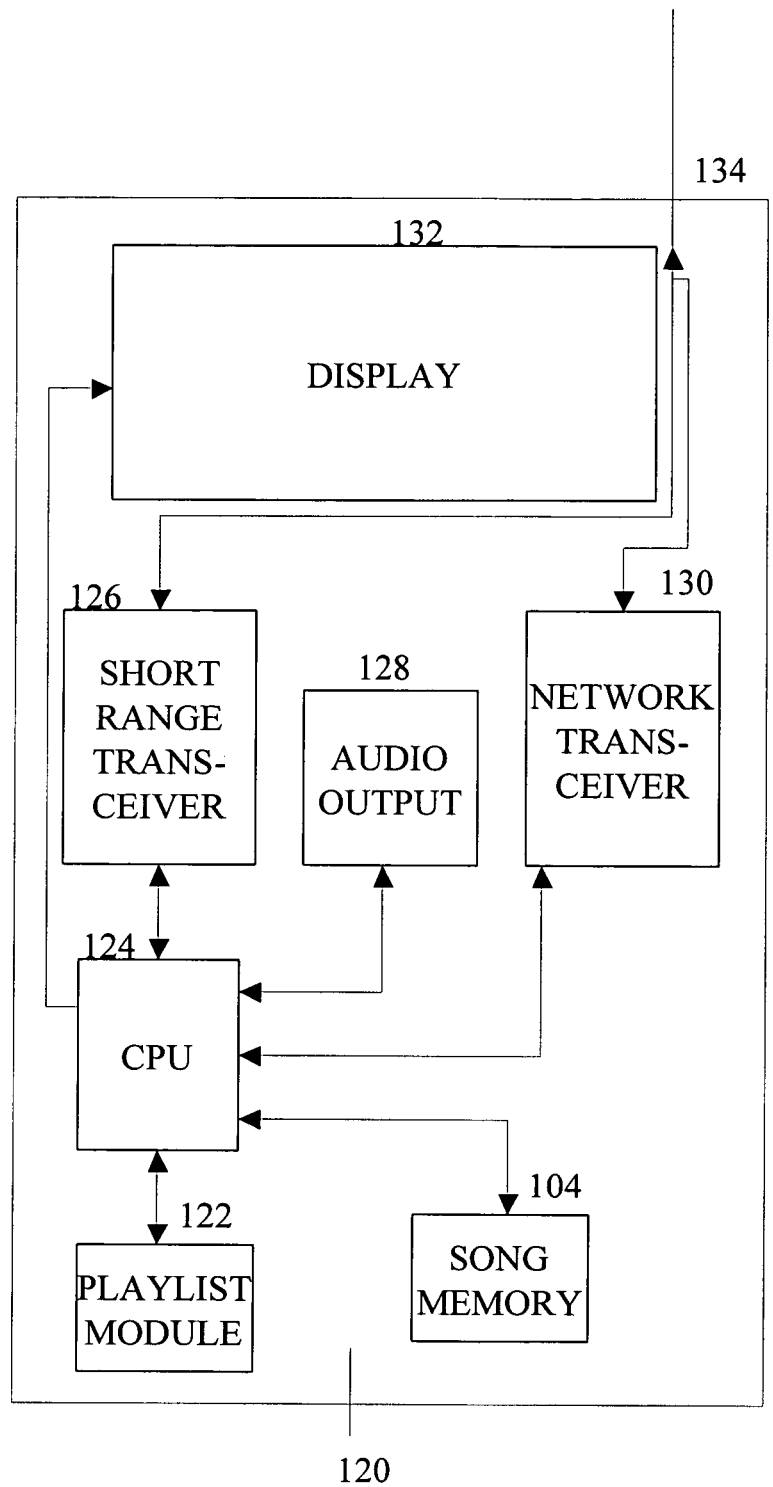
FIG. 1A illustrates an exemplary mobile music device, in accordance with an embodiment of the invention.

FIG. 1A illustrates an exemplary mobile music device 120 in accordance with an embodiment of the invention. Mobile music device 120 includes a song memory 104. Song memory 104 is described above. A playlist module 122 may be included for recording and and/or maintaining a log of user behaviors that may be used to generate playlists. Exemplary behaviors include recording a song, skipping a song, replaying a song, etc. A CPU 124 may be included to control the overall operation of mobile music device 120.

Mobile music device 120 may include one or more components for communicating with external devices. A short-range transceiver 126 may be included for communicating with devices such as computer device 108. In one embodiment, short-range transceiver 126 uses the Bluetooth protocol. Ultra Wideband technology may also be used for transferring large files. It should be noted that also other wireless short-range technologies may be used for communicating with other devices. Mobile music device 120 may also include conventional components such as an audio output 128, a network transceiver 130, a display 132 and an antenna 134. Moreover, mobile music device 120 may also include a camera that allows a user to record media pieces in the form of pictures, images and video. Display 132 may be used to playback picture, image and video media pieces. A time module and calendar module may be included to provide inputs during the music selection process.

Figure 1B:
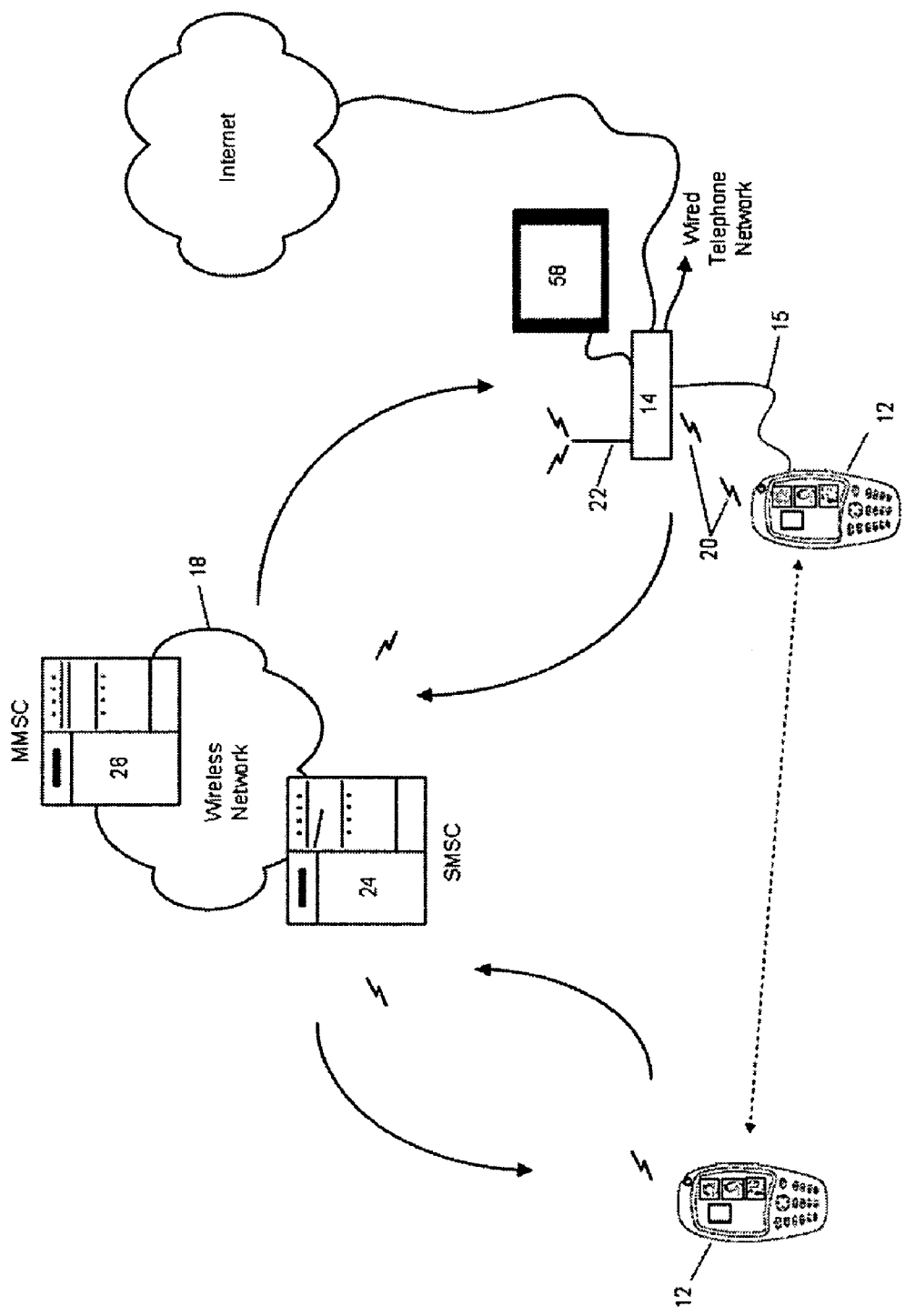
FIG. 1B illustrates an exemplary wireless communications system in which systems and methods of the present invention may be employed.

FIG. 1B shows an example of a wireless communication system 10 in which the systems and methods of the present invention may be advantageously employed. One or more network-enabled mobile devices 12, such as a personal digital assistant (PDA), digital camera, cellular phone, mobile terminal, or combinations thereof, is in communication with a server 14. Although not shown in FIG. 1B, server 14 may act as a file server for a network such as home network, some other Local Area Network (LAN), or a Wide Area Network (WAN). Server 14 may be a personal computer, a mainframe, a television set-top box, or other device capable of storing and accessing data. Mobile device 12 may communicate with server 14 in a variety of manners. For example, mobile device 12 may communicate with server 14 via wireless network 18. Wireless network 18 may be a third-generation (3G) cellular data communications network, a Global System for Mobile communications network (GSM), or other wireless communication network. Mobile device 12 may also have one or more ports allowing a wired connection to server 14 via, e.g., universal serial bus (USB) cable 15. Mobile device 12 may also be capable of short-range wireless connection 20 (e.g., a BLUETOOTH link) to server 14. A single mobile device 12 may be able to communicate with server 14 in multiple manners.

Server 14 may act as a repository for storing files received from mobile device 12 and from other sources. Server 14 may have, or be coupled to, a wireless interface 22 configured to transmit and/or receive communications (such as messages, files, or other data) with mobile network 18. Server 14 may alternatively (or also) have one or more other communication network connections. For example, server 14 may be linked (directly or via one or more intermediate networks) to the Internet, to a conventional wired telephone system, or to some other communication network.

In one embodiment, mobile device 12 has a wireless interface configured to send and/or receive digital wireless communications within wireless network 18. As part of wireless network 18, one or more base stations (not shown) may support digital communications with mobile device 12 while the mobile device is located within the administrative domain of wireless network 18. The base station of wireless network 18 that is in communication with mobile device 12 may be the same or a different base station that is in communication with server 14. Indeed, mobile device 12 and server 14 may each be in communication with different wireless networks (e.g., mobile device 12 could be roaming), which could in turn be interlinked via one or more intermediate wired or wireless networks. For simplicity, server 14 and mobile device 12 are shown within the same wireless network 18.

Mobile device 12 communicates with server 14 via wireless network 18 and is configured to transmit data (such as, e.g., music content) for remote storage on server 14. Mobile device 12 may also be configured to access data previously stored on server 14. In one embodiment, file transfers between mobile device 12 and server 14 may occur via Short Message Service (SMS) messages and/or Multimedia Messaging Service (MMS) messages transmitted via short message service center (SMSC) 24 and/or a multimedia messaging service center (MMSC) 26. Although shown as part of network 18, SMSC 24 and MMSC 26 may be part of another network or otherwise outside of network 18. Although shown as separate logical entities, SMSC 24 and MMSC 26 could be a single entity. Further, SMSC 24 and MMSC 26 may coordinate via signaling between themselves for improving the file transfer process. For example, because SMSC 24 and MMSC 26 may be store-and-forward systems, rather than real-time systems, a file requested via an SMS message from mobile device 12 may still reside on MMSC 26 based upon a previous request. As such, SMSC 24 may copy MMSC 26 on an SMS file request and, if applicable, MMSC 26 may notify the user of the previously stored file. Further, MMSC 26 may simply transfer the requested file based on its stored copy of the file. In other embodiments, MMSC 26 may act as a repository for files, and mobile device 12 may simply request transfer of files from MMSC 26.

Figure 2:
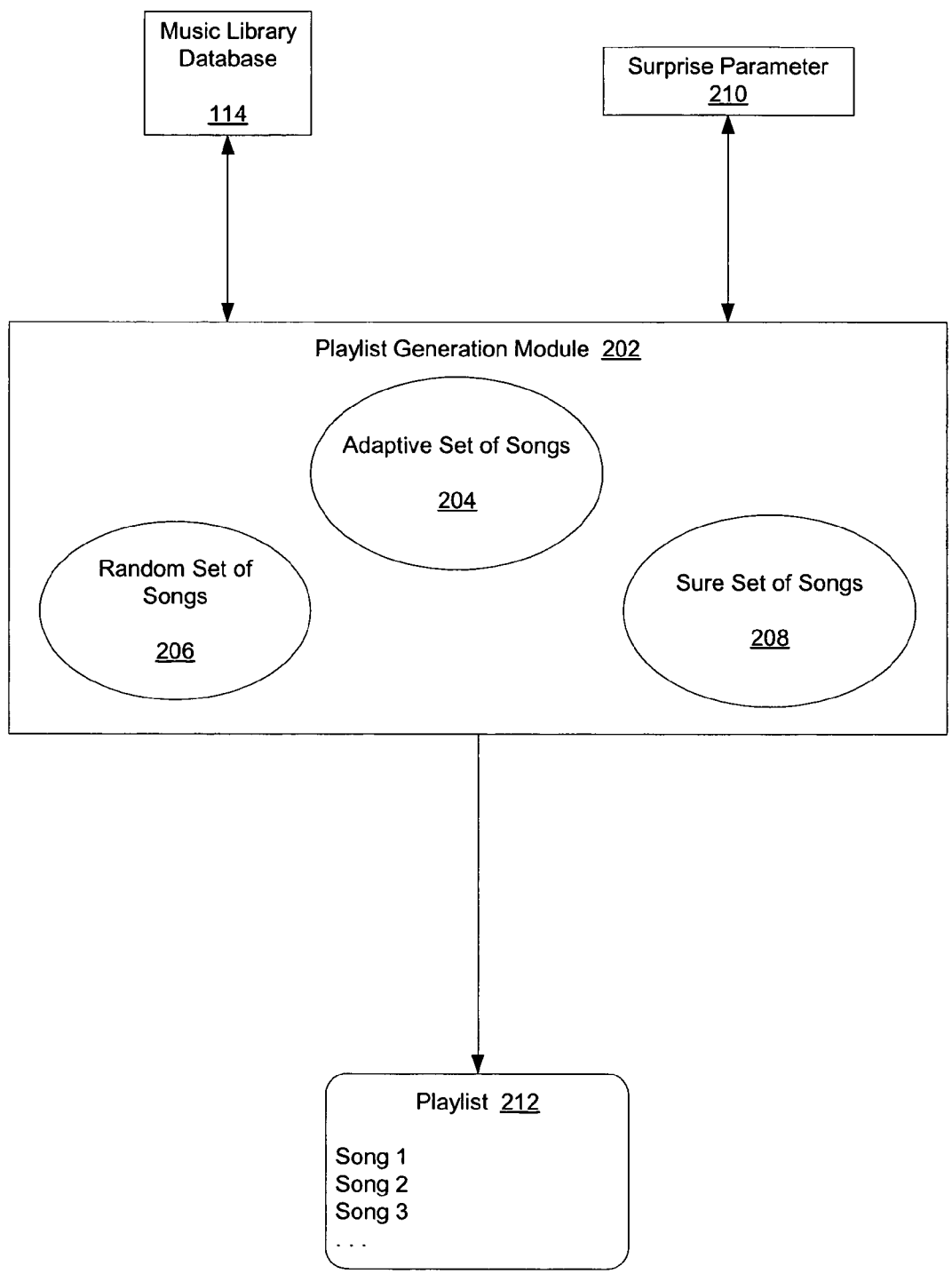
FIG. 2 illustrates a relationship between sets of songs and a playlist in accordance with an embodiment of the invention.

FIG. 2 illustrates a relationship between sets of songs and a playlist in accordance with an embodiment of the invention. The basic relationship shown in FIG. 2 may be applied to other implementations that include other media pieces, such as songs and video clips. A playlist generation module 202 generates an adaptive set of songs 204, a random set of songs 206, a sure set of songs 208 and receives a surprise parameter 210 and produces a playlist 212. Playlist generation module 202 may also receive adaptive set of songs 204, random set of songs 206 and/or sure set of songs 208 from another source.

Adaptive set of songs 204 may be selected based on attributes that correspond to activities of a user or other factors such as the time of day and date. Such activities may include recording the songs, repeating the songs and not skipping the songs. Time information may be used, for example, to select a playlist based on whether it is early in the morning or in the afternoon. Date information may be used, for example, to select different music during holidays or weekends than would be selected during a work week.

Exemplary attributes and values that capture aspects of a user's behavior with respect to a song include:
1. Recorded: boolean. Is the song recorded by the user (vs. automatically by the system)?
2. Skipped: integer>=0. Approximate number of times the song has been skipped by the user during replay. A song may be considered skipped if the user presses a "next" button during the replay of the song and the song has been playing for less than a predetermined period of time, such as 1 minute. In one embodiment, a song is not considered skipped if a "previous" button was used to reach the song.

3. Repeated: integer>=0. Number of songs replayed since the song was last repeated by the user. A song may be considered repeated when a user presses "previous" button to reach the song and listens to it more than, say, 30 seconds. A user might be looking for a song replayed some time ago, and during the search for the song he listens to the beginnings of other songs. When counting the number of songs replayed since last repeat, also skipped and repeated songs count as replayed.

4. Age: integer>=0. Number of days since the song was recorded (by the user or by the system). In alternative embodiments different time frames may be used.

5. Last_played: integer>=0. Number of songs replayed since the last replay of this song. One advantage of using the number of songs is that the choice adapts to the user's rate of listening to a playlist. Alternatively Last_played could be the number of days since the last replay of this song.

An attribute of a given song, such as repeated, may be denoted by song.repeated.

In one embodiment, adaptive set of songs 204 is more likely to include recently recorded songs than older recordings. Random set of songs 206 may include a set of songs that are not necessarily preferred by the user. Random set of songs 206 may be used to add variety to the ultimate playlist. Sure set of songs may include songs that are known to be liked by the user. The user may indicate which songs to include in sure set of songs 208. In an alternative embodiment, one or more activities of the user, such as recording a song and repeating a song, may be used in the selection of sure set of songs 208. Surprise parameter 210 may be supplied by the user and may determine the percentage of songs included in the playlist that are from random set of songs 206. Surprise parameter may have a value of 0% to 100% or may comprise other values such as high, medium and low.

In one embodiment of the invention, playlist 212 includes a first group of songs selected from sure set of songs 208. These songs may be placed at the beginning of the playlist to ensure a good user experience. Next, playlist 212 includes songs selected both from adaptive set of songs 204 and random set of songs 206 with a ratio determined by surprise parameter 210. Once playlist 212 is generated, the corresponding music files are downloaded from personal music library database 110, or alternatively from music library database 114 over the Internet 112.

Playlist 212 may be created separately for each station or genre that the user listens to. For example, a first genre of music may include jazz songs and the songs comprising playlist 212 may be selected from a particular jazz station. Time, place and other factors may influence the content of playlist 212.

Figure 3:
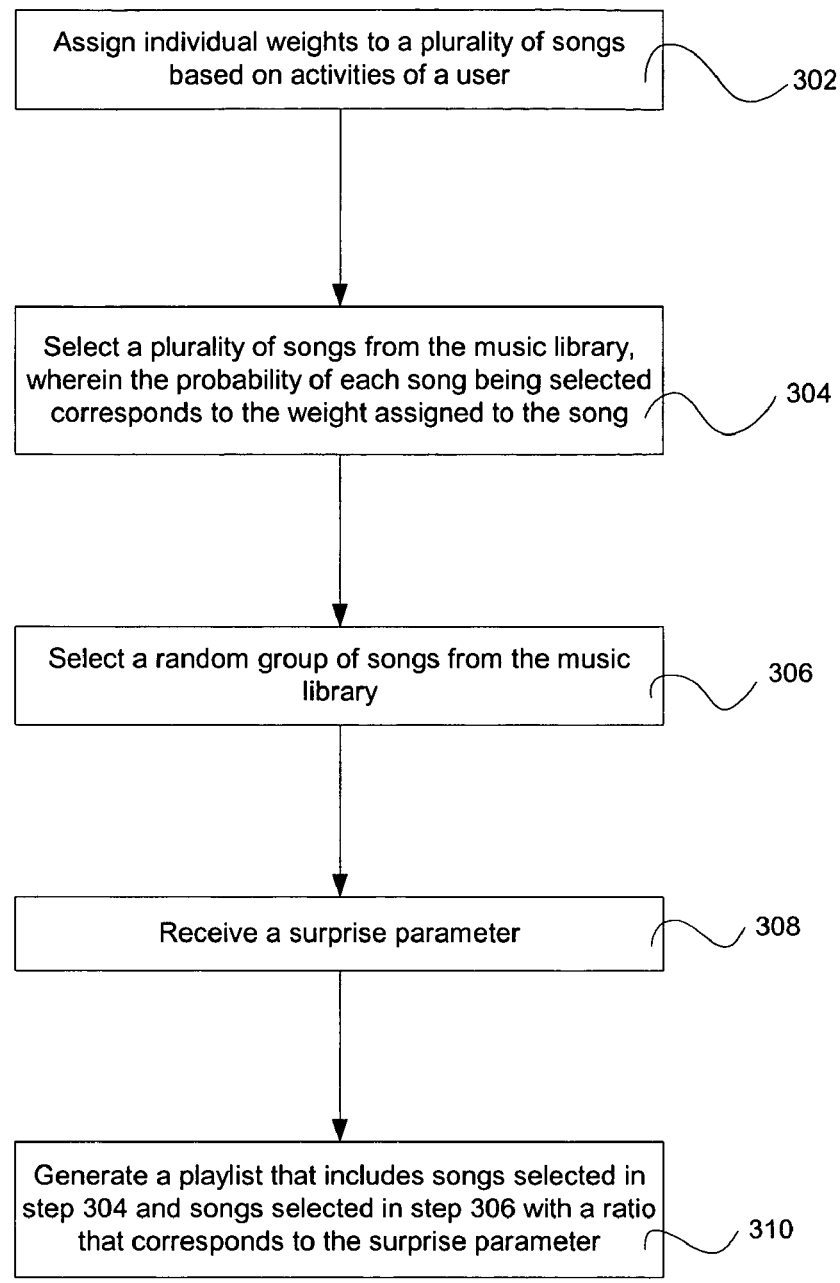
FIG. 3 illustrates a method of generating a playlist in accordance with an embodiment of the invention.

FIG. 3 illustrates a method of generating a playlist in accordance with an embodiment of the invention. First, in step 302, individual weights are assigned to a plurality of songs based on activities of a user. The weights may be used to select an adaptive set of songs. A first weight $w_{1a}(song)$ may be selected to favor recorded songs, such that:

$w_{1a}(song)=1$ if song.recorded=true $w_{1a}(song)=0$ otherwise.

A second weight $w_{1b}(song)$ may be selected to favor songs that the user has repeated over other songs. Recently repeated songs may also be favored over older songs. For example, $w_{1b}(song)$ may be used to define how much more likely recently repeated songs are to select than songs that have never been repeated by defining $w_{1b}(song)$ as follows:

$w_{1b}(song)=1+2^{-song.repeated/h_{1b}}*\max\_weight_{1b}$.

In one embodiment, the following values are used as default choices.

$\max\_weight_{1b}=3$ $h_{1b}=20$

For a song that has never been repeated, $w_{1b}(song)$ may be defined to equal 1. When the last song that was replayed was also repeated, $w_{1b}(song)=1+\max\_weight_{1b}$. The weight (actually weight−1) halves every $h_{1b}$ days and approaches 1 for songs last repeated a long time ago.

A third weight $w_{1c}(song)$ may be selected to favor songs that have not been skipped by the user over songs that have been skipped. In one embodiment, songs that have never been skipped may have a $w_{1c}(song)$ equal to one. Songs skipped and not recorded by the user may have a $w_{1c}(song)$ equal to zero and songs recorded by the user may have a $w_{1c}(song)$ that quickly decreases. For example:

If song.skipped=0 then $w_{1c}(song)=1$

If song.recorded=true then $w_{1c}(song)=2^{-song.skipped/h_{1c}}$

If song.recorded=false and song.skipped>0 then $w_{1c}(song)=0$

In one embodiment, $h_{1c}=0.5$.

A fourth weight $w_{1d}(song)$ may be selected to favor recently recorded songs. In one embodiment, $w_{1d}(song)$ may be equal to one for sounds recorded on the day that the weight is used and $w_{1d}(song)$ may be equal to $2^{-song.age/h_{1d}}$ for songs recorded at other times. The value hid may be used to represent a half-life of the weight. For example, an $h_{1d}=10$ implies only very recent songs are favored and an $h_{1d}=1000$ implies older songs have almost equal weights. A suitable default value for $h_{1d}$ is 100.

A fifth weight $w_{3a}(song)$ may be selected to favor songs that have not been replayed recently over songs that have been replayed recently. For recently played songs $w_{3a}(song)$ may be very small and $w_{3a}(song)$ may approach 1 for songs that have not been played in a long time. For example:

$w_{3a}(song)=1$, if song has never been replayed $w_{3a}(song)=1/(1+steep^{-song.last\_played+h_{3a}})$, if the song has been replayed where "steep" is a parameter that governs how steep or sharp the division to recent and old songs is and $h_{3a}$ is the half life and governs where the division takes place. A suitable default value for steep is 1.2 and for $h_{3a}$ is 30.

In step 304, a plurality of songs are selected from the music library, wherein the probability of each song being selected corresponds to the weight assigned to the song. In one embodiment, the weight assigned to each song $w_{adapt}(song)$ is equal to the product of the five weights described above. The probability of a given song being selected $Pr_{adapt}(song)$ is proportional to its weight $w_{adapt}(song)$. For example:

$Pr_{adapt}(song)=w_{adapt}(song)/\Sigma_i w_{adapt}(song_i)$.

In step 306, a random group of songs is selected from the music library. In one embodiment, the random group of songs may be selected based on random weights assigned to each song and the random weight of each song $w_{rand}(song)$ may be defined as follows:

$$w_{rand}(song) = w_{1c}(song) * w_{3a}(song).$$

In step 308, a surprise parameter may be received. The surprise parameter may be received from a user or selected by a playlist generation module. The surprise parameter may have a value of 0-100% and may represent the fraction of songs selected without regard to weights w1a(song), w1b (song) and w1d(song). A suitable default value for surprise factor is 20%.

Finally, in step 310, a playlist is generated that includes songs selected in step 304 and songs selected in step 306 with a ratio that corresponds to the surprise parameter. After the songs in the playlist are replayed, the songs may be reordered to provide variety.

Figure 4:
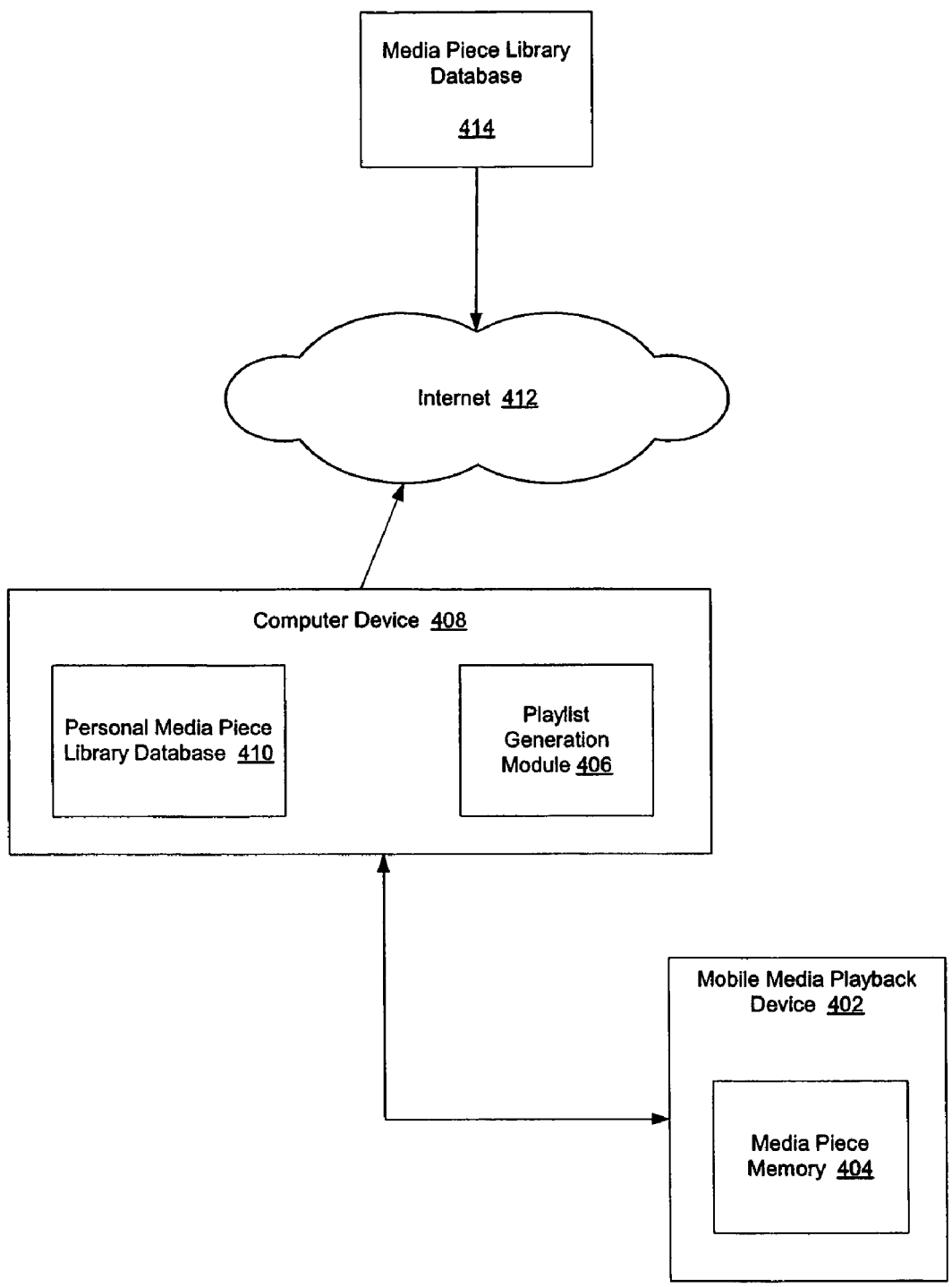
FIG. 4 illustrates a mobile media playback system, in accordance with an embodiment of the invention.

As mentioned above, embodiments of the invention may use media pieces other than music or songs. In particular, the playlist selection methods disclosed herein may be used to generate playlists of images, pictures, video clips and other visual and/or audio pieces. FIG. 4 illustrates a mobile media playback system that is similar to the mobile music system shown in FIG. 1. A mobile media playback device 402 stores and plays back media to a user. For example, mobile media playback device 402 may be a personal digital assistant that plays back images to a user. Mobile music device 402 includes a media piece memory 404 for storing media pieces. Media piece memory 404 may be implemented with a removable memory module or a stationary memory module.

Mobile music device 402 may be coupled to a computer device 408 that includes a personal media piece library database 410 for storing media pieces and a playlist generation module 406. Computer device 408 may be similar to computer device 108 (shown in FIG. 1). Computer device 408 may be coupled to a wide area network, such as the Internet 412. Numerous databases and media websites, such as media piece library database 414 may also be coupled to the Internet 412. The operation of the elements shown in FIG. 4 is substantially similar to the operation of the elements shown in FIG. 4.

Aspects of the resent invention may also be applied to other embodiments that do not include mobile devices. For example, the playlist selection methods disclosed herein may be used to generate a playlist of images to display on a wall mounted display devices, such as a plasma television or liquid crystal television.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

Appendix

The following code written in Perl is an exemplary algorithm that may be used by a playlist generation module to select a playlist.

Variables used (and not introduced in the algorithm):
    music_library_size: total number of songs in the music library
    recorded_by_the_user: number of songs recorded by the user
    first_songs: number of first songs to be selected as "sure"
    surprise_ratio: surprise_ratio
    last_played[ ]: array of last_played attributes of songs For simplicity, in the algorithm below songs are identified by an index between 0 and music_library_size−1, and the first recorded_by_the_user songs are the ones recorded by the user.

```
# 1. init playlist
my @playlist = ( ); # playlist to be generated
my $playlist_filled = 0; # number of songs in playlist so far
my $users_songs = 0; # number of user recorded songs in playlist so far
# 2. find out largest weights (normalization factors)
my $max_w_sure = 0;
my $max_w_adapt = 0;
my $max_w_rand = 0;
for ($s = 0; $s < $music_library_size; $s++) {
    $max_w_sure = (w_sure($s) > $max_w_sure ? w_sure($s) : $max_w_sure);
    $max_w_adapt = (w_adapt($s) > $max_w_adapt ? w_adapt($s) : $max_w_adapt);
    $max_w_rand = (w_rand($s) > $max_w_rand ? w_rand($s) : $max_w_rand);
}
# 3. create a backup copy of last_played
my @last_played_copy;
for ($s = 0; $s < $music_library_size; $s++) {
    $last_played_copy[$s] = $last_played[$s];
}
# 4. while playlist has room repeat
while (($playlist_filled < $playlist_size)
        ($playlist_filled < $music_library_size)) {
    # 4.1. decide how to select a song and then search for one
    my $random_song;
    if ($playlist_filled < $first_songs) {
        # Make a sure selection
# (Using rejection sampling: propose a random song (1), reject it
        # stochastically (2) depending on the relative probability of the
        # song. Repeat this until a proposed song is accepted.)
        do {
            $random_song = int(rand($recorded_by_the_user));    # (1)
        } while (rand( ) > w_sure($random_song)/$max_w_sure);   # (2)
    } elseif ((rand( ) > $surprise_ratio/100) &&
```

```
            ($users_songs < $recorded_by_the_user)) {
        # Select a song recorded by the user
        do {
            $random_song = int(rand($recorded_by_the_user));
        } while (rand( ) > w_adapt($random_song)/$max_w_adapt);
        $users_songs++;
    } else {
        # Select a random song
        do {
            $random_song = $recorded_by_the_user +
            int(rand($music_library_size - $recorded_by_the_user));
        } while (rand( ) > w_rand($random_song)/$max_w_rand);
    }
    # 4.2. add the song to the playlist
    $playlist[$playlist_filled++] = $random_song;
    # 4.3. update last_played fields
    for ($s = 0; $s < $music_library_size; $s++) {
        $last_played[$s]++;
    }
    $last_played[$random_song] = 0;
# 4.4. find out new largest weights
    my $max_w_sure = 0;
    my $max_w_adapt = 0;
    my $max_w_rand = 0;
    for ($s = 0; $s < $music_library_size; $s++) {
        $max_w_sure = (w_sure($s) > $max_w_sure ? w_sure($s) : $max_w_sure);
        $max_w_adapt = (w_adapt($s) > $max_w_adapt ? w_adapt($s) : $max_w_adapt);
        $max_w_rand = (w_rand($s) > $max_w_rand ? w_rand($s) : $max_w_rand);
    }
}
# 5. restore last_played to its original value
for ($s = 0; $s < $music_library_size; $s++) {
    $last_played[$s] = $last_played_copy[$s];
}
```

We claim:

1. A method comprising:
   (a) assigning individual weights to a plurality of media pieces based on activities of a user in relation to the media pieces;
   (b) selecting a plurality of media pieces from a media library to form an adaptive set of media pieces, wherein the probability of each media pieces being selected corresponds to the weight assigned to the media pieces;
   (c) selecting a random group of media pieces from the media library to form a random set of media pieces, the random set of media pieces being different than the adaptive set of media pieces; and
   (d) generating in a computer readable memory a playlist that is executable in a computer device, wherein the playlist includes media pieces selected from the adaptive set and media pieces selected from the random set with a ratio that corresponds to a surprise parameter.

2. The method of claim 1, wherein (a) comprises favoring media pieces that have been imported by the user over media pieces that have been recorded automatically.

3. The method of claim 1, wherein (a) comprises favoring media pieces repeated by a user over media pieces that have not been repeated by the user.

4. The method of claim 1, wherein (a) comprises favoring media pieces that have not been skipped by the user over media pieces that have been skipped by the user.

5. The method of claim 1, wherein (a) comprises favoring recently recorded media pieces over less recently recorded media pieces.

6. The method of claim 1, wherein (a) comprises favoring media pieces that have not been replayed recently over media pieces that have been replayed recently.

7. The method of claim 1, wherein (a) comprises:
   (i) favoring media pieces that have been recorded by the user over media pieces that have been recorded automatically;
   (ii) favoring media pieces repeated by a user over media pieces that have not been repeated by the user;
   (iii) favoring media pieces that have not been skipped by the user over media pieces that have been skipped by the user;
   (iv) favoring recently recorded media pieces over less recently recorded media; and
   (v) favoring media pieces that have not been replayed recently over media pieces that have been replayed recently.

8. The method of claim 1, further including assigning preferred media pieces to the beginning of the playlist.

9. The method of claim 8, wherein the preferred media pieces comprise media pieces imported by the user.

10. The method of claim 9, wherein the preferred media pieces further comprise media pieces that have not been skipped by the user.

11. The method of claim 1, wherein the surprise parameter is selected by the user.

12. The method of claim 1, further including reordering the media pieces after all of the media pieces have been played.

13. The method of claim 1, further including (e) downloading the plurality of media pieces from the music library.

14. The method of claim 13, wherein (e) comprises downloading the plurality of media pieces from a website.

15. The method of claim 13, wherein (e) comprises downloading the plurality of media pieces from a computer to an audio player coupled to the computer.

16. A computer-readable medium containing computer-executable instructions for causing a media device to perform the steps comprising:
(a) assigning individual weights to a plurality of media pieces based on activities of a user in relation to the media pieces;
(b) selecting a plurality of media pieces from the media library to form an adaptive set of media pieces, wherein the probability of each media piece being selected corresponds to the weight assigned to the media pieces;
(c) selecting a random group of media pieces from the media library to form a random set of media pieces, the random set of media pieces being different than the adaptive set of media pieces; and
(d) generating in a computer readable memory a playlist that is executable in a computer device, wherein the playlist includes media pieces selected from the adaptive set and media pieces selected from the random set with a ratio that corresponds to a surprise parameter.

17. A mobile media device comprising:
a playlist generation module configured to generate a media playlist by:
assigning individual weights to a plurality of media pieces based on activities of a user in relation to the media pieces,
selecting a plurality of media pieces from a media library to form an adaptive set of media pieces, wherein the probability of each media piece being selected corresponds to the weight assigned to the media pieces;
selecting a random group of media pieces from the media library to form a random set of media pieces, the random set of media pieces being different than the adaptive set of media pieces; and
generating in a computer readable memory a media playlist that is executable in a computer device, wherein the media playlist includes the media pieces selected from the adaptive set based on weight and the media pieces selected in random from the random set with a ratio that corresponds to a surprise parameter.

18. The mobile media device of claim 17, further including a short-range transceiver.

19. The mobile media device of claim 18, wherein the short-range transceiver is configured to use a Bluetooth protocol.

20. The mobile media device of claim 17, further including a time module that tracks the current time.

21. The mobile media device of claim 17, further including a calendar module that tracks the current date.

22. A system for providing media to a user, the system comprising:
a computer device that includes a playlist generation module configured to generate an media playlist by:
assigning individual weights to a plurality of media pieces based on activities of a user in relation to the media pieces,
selecting a plurality of media pieces from a media library to form an adaptive set of media pieces, wherein the probability of each media piece being selected corresponds to the weight assigned to the media piece;
selecting a random group of media pieces from the media library to form a random set of media pieces, the random set of media pieces being different than the adaptive set of media pieces; and
generating a media playlist that includes the media pieces selected from the adaptive set based on weight and media pieces selected in random from the random set with a ratio that corresponds to a surprise parameter; and
a mobile media device that receives from the computer device media pieces selected by the playlist generation module.

23. The system of claim 22, wherein the mobile media device includes a short-range transceiver for communicating with the computer device to receive the selected songs.

24. A system for providing music to a user, the system comprising:
a mobile music device that includes a playlist generation module configured to generate an audio playlist by:
assigning individual weights to a plurality of songs based on activities of a user in relation to the songs;
selecting a plurality of songs from a music library to form an adaptive set of songs, wherein the probability of each song being selected corresponds to the weight assigned to the song;
selecting a random group of songs from the music library to form a random set of songs, the random set of songs being different than the adaptive set of songs; and
generating a playlist that includes the songs selected from the adaptive set based on weight and songs selected in random from the random set with a ratio that corresponds to a surprise parameter; and
a computer device that includes a music reproduction module and that receives the audio playlist from the mobile music device.

* * * * *